United States Patent [19]
Gaskill

[11] Patent Number: 5,629,940
[45] Date of Patent: May 13, 1997

[54] TRANSMITTING AND RECEIVING LONG MESSAGES IN A WIRELESS ONE-WAY COMMUNICATION SYSTEM WHILE RESERVING SELECTED SLOTS FOR SHORT MESSAGES

[75] Inventor: Garold B. Gaskill, Tualatin, Oreg.

[73] Assignee: Seiko Communications Holding N.V., Netherlands Antilles

[21] Appl. No.: 627,635

[22] Filed: Apr. 4, 1996

Related U.S. Application Data

[63] Continuation of Ser. No. 277,913, Jul. 20, 1994, abandoned, which is a continuation of Ser. No. 981,968, Nov. 25, 1992, Pat. No. 5,552,779, which is a continuation of Ser. No. 568,932, Aug. 17, 1990, Pat. No. 5,168,271, which is a continuation of Ser. No. 101,137, Sep. 24, 1987, abandoned, which is a division of Ser. No. 802,844, Nov. 27, 1985, Pat. No. 4,713,808.

[51] Int. Cl.$^6$ ..................................................... H04J 3/26
[52] U.S. Cl. .................... 370/311; 379/58; 340/825.44; 455/32.1; 370/346; 370/349; 370/471; 370/473
[58] Field of Search .................... 370/82, 84, 94.1, 370/110.1, 95.1, 95.2, 105.1, 95.3, 79; 379/58, 59, 60; 340/825.44, 825.47, 825.48; 455/31, 32.1

[56] References Cited

U.S. PATENT DOCUMENTS

| 4,713,808 | 12/1987 | Gaskill et al. | 370/94 |
|---|---|---|---|
| 4,875,038 | 10/1989 | Siwiak et al. | 340/825 |
| 4,882,579 | 11/1989 | Siwiak | 340/825 |
| 4,891,637 | 1/1990 | Siwiak et al. | 340/825 |
| 4,897,835 | 1/1990 | Gaskill et al. | 370/94.1 |
| 4,928,096 | 5/1990 | Leonardo et al. | 340/825 |
| 4,940,963 | 7/1990 | Gutman et al. | 340/313 |
| 4,951,044 | 8/1990 | Nelson et al. | 340/825 |
| 5,070,329 | 12/1991 | Jasinaki | 340/825 |
| 5,117,460 | 5/1992 | Berry et al. | 381/41 |
| 5,124,697 | 6/1992 | Moore | 340/825 |
| 5,142,279 | 8/1992 | Jasinski et al. | 340/825 |
| 5,142,692 | 8/1992 | Owen | 455/48 |
| 5,148,469 | 9/1992 | Price | 379/57 |
| 5,150,110 | 9/1992 | Breeden | 340/825 |
| 5,153,582 | 10/1992 | Davis | 340/825 |
| 5,155,479 | 10/1992 | Ragan | 340/825.44 |
| 5,159,331 | 10/1992 | Park et al. | 340/825.44 |
| 5,162,790 | 11/1992 | Jasinski | 340/825 |
| 5,166,932 | 11/1992 | Hoff et al. | 370/95.1 |
| 5,168,271 | 12/1992 | Hoff | 370/95.1 |
| 5,170,487 | 12/1992 | Peek | 455/45 |
| 5,185,604 | 2/1993 | Nepple et al. | 340/825.44 |
| 5,187,470 | 2/1993 | King et al. | 340/825.44 |
| 5,189,413 | 2/1993 | Gaskill et al. | 340/825.44 |
| 5,220,366 | 6/1993 | King | 354/76 |
| 5,260,700 | 11/1993 | Merchant et al. | 340/825.44 |
| 5,311,516 | 5/1994 | Kuznicki et al. | 370/94.1 |

FOREIGN PATENT DOCUMENTS

| 9111868 | 8/1991 | European Pat. Off. | 370/94.1 |
|---|---|---|---|
| 0270929 | 12/1986 | Japan | 371/32 |

Primary Examiner—Alpus H. Hsu
Assistant Examiner—Seema S. Rao
Attorney, Agent, or Firm—Elmer Galbi

[57] ABSTRACT

A receiver operates in both a first polling protocol and in a selectable data acquisition protocol to both conserve power while quickly read long messages in wireless one-way communication systems. The receiver first polls data transmissions at a relatively slow periodic rate to identify messages. When the receiver identifies a corresponding address in the data transmission, a format packet directs the receiver to acquire data using a second data acquisition protocol independent of the polling protocol. The data acquisition protocol enables long messages to be communicated in a fast, highly reliable manner. After the long message is successfully transmitted, the receiver automatically reverts back into a polling protocol to conserve power.

2 Claims, 5 Drawing Sheets

| Packet Type / Byte Number | Initial Pkt using Pointers | Additional Pkts using Pointers | Initial Pkt. starting Fast Cycle | Additional Pkts using Fast Cycle | Initial Assignment Logical Channel | Additional Pkts using Logical Channels |
|---|---|---|---|---|---|---|
| 1 | Slot 0-7 | Slot 0-7 | Slot 0-7 | Slot 0-7 | Slot 0-7 | Slot 0-7 |
| 2 | Slot 8,9 Addr 10-15 | Slot 8,9 Addr 10-15 | Slot 8,9 Addr 10-15 | Slot 8,9 Tmp Addr 0..63 | Slot 8,9 Addr 10-15 | Slot 8,9 Channel 0..63 |
| 3 | PI - 68, E8 | PA - 48, C8 | FCI - 51, D1 | FCA - 58, D8 | LCI - 71, F1 | LCA - 78, F8 |
| 4 | Msg. Ctrl | Pkt. Seq. # | Msg. Ctrl | Pkt. Seq. # | Msg. Ctrl | Pkt. Seq. # |
| 5 | Group Ring | Group Ring | Group Ring | Group Ring | Group Ring | Group Ring |
| 6 | Addr 16-23 | Data | Addr 16-23 | Data | Addr 16-23 | Data |
| 7 | Addr 24-31 | Data | Addr 24-31 | Data | Addr 24-31 | Data |
| 8 | Data Octets | Data | Total Pkts | Data | Data Rate 0-7 | Data |
| 9 | R. Slot/Data | Data | FC Rate 0-7 | Data | Data Rate 8-15 | Data |
| 10 | R. Slot/Data | Data | On Time Mult. | Data | Data Rate 16-23 | Data |
| 11 | R. Slot/Data | Data | Temp Addr. | Data | Data Rate 24-31 | Data |
| 12 | R. Slot/Data | Data | R. Slot Start | Data | Channel control | Data |
| 13 | R. Slot/Data | Data | Data Octets-L | Data | Channel 0..63 | Data |
| 14 | R. Slot/Data | Data | Data Octets-H | Data | Spare | Data |
| 15 | R. Slot/Data | Data | Spare | Data | Spare | Data |
| 16 | R. Slot/Data | Data | Spare | Data | Spare | Data |
| 17 | R. Slot/Data | Data | Spare | Data | Spare | Data |
| 18 | R. Slot/Data | Data | Spare | Data | Spare | Data |
| 19 | CRC | CRC | CRC | CRC | CRC | CRC |
| 20 | CRC | CRC | CRC | CRC | CRC | CRC |
|  | 50 | 52 | 54 | 56 | 58 | 60 |

TRANSMITTING AND RECEIVING LONG MESSAGES IN A WIRELESS ONE-WAY COMMUNICATION SYSTEM WHILE RESERVING SELECTED SLOTS FOR SHORT MESSAGES

This application is a continuation of U.S. patent application Ser. No. 08/277,913, filed Jul. 20, 1994 which is now abandoned which is a continuation of U.S. patent application Ser. No. 07/981,968, filed Nov. 25, 1992 which is now U.S. Pat. No. 5,552,779 which is a continuation of U.S. patent application Ser. No. 07/568,932, filed Aug. 17, 1990 which is now U.S. Pat. No. 5,168,271 which is a continuation of U.S. patent application Ser. No. 07/101,137, filed Sep. 24, 1987 which is now abandoned which is a division of U.S. patent application Ser. No. 06/802,844, filed Nov. 27, 1985 which is now U.S. Pat. No. 4,713,808.

BACKGROUND OF THE INVENTION

This invention relates generally to wireless one-way communication systems and more particularly to a transmission and reception protocol that increases battery life in data receivers while maintaining reliable data transmission.

Radio paging devices and protocols are presently utilized in commercial paging networks to transmit short messages of around ten characters or less. For example, U.S. Pat. No. 4,713,808 to Gaskill et al., describes a paging system and protocol that transmits messages to a portable paging receiver. To extend battery life, the paging receiver periodically polls for data transmitted during specific time slots in a time division multiplexed (TDM) data stream.

Since the paging receiver is activated only in bursts for brief periods of time, little power is needed to operate the receiver over an extended period of time. Thus, batteries used in the receiver typically operate for up to one year.

Polling a data channel in brief time bursts is an efficient means for transmitting and receiving short messages. However, this communication protocol is not as effective when transmitting long messages of more than ten or twenty characters. For example, U.S. Pat. No. 4,713,808 describes a (TDM) data protocol where messages are queued into time slots and multiplexed together to form data frames. A receiver then polls the data frame during discrete time instances, such as once every few minutes.

The receiver is synchronized with the transmitter so that any message directed to the receiver will be transmitted at the same time that the receiver is turned on. If an address contained in the time slot is the same as an assigned address of the receiver, a data packet contained in the time slot is targeted for that receiver. The receiver will then read the data packet and output the messages contained in the data packet.

If the message is long, for example, more than ten characters, it cannot be contained within the single data packet of a time slot. Thus, the entire message must be transmitted by sending several portions of the message over several time slots. The receiver polling rate, however, is too slow to transmit the long message in a time efficient manner. For example, if the receiver only polls for messages once every two minutes, a long message extending over say five time slots would take at least ten minutes to transmit. In addition, messages are typically transmitted several times to ensure message reception. Thus, the time required to transmit the long message would be further increased several times.

If the polling rate of the receiver is increased to reduce the amount of time required to send a long message, the operating life of the batteries used for operating the receiver is proportionately reduced. Alternatively, long message transmission rates could be increased by eliminating transmission of redundant data. However, eliminating message redundancy reduces data transmission reliability and increases the probability that messages will not be accurately transmitted and received.

Accordingly, a need remains for quickly and reliably transmitting and receiving long messages while maintaining low receiver power consumption.

SUMMARY OF THE INVENTION

The present invention uses a programmable data acquisition rate for quickly communicating long messages while maintaining extended battery life and reserving selected slots for short messages. A receiver polls data in sequence with an predefined time slot in a transmitted data frame. If an initial data packet within the time slot indicates that a long message has been transmitted, the receiver continues to further read the data packet to determine a specific data acquisition protocol for reading the long message.

In one embodiment, a pointer packet contains a set of pointers that identify relative time slot locations in the data frame that contain each portion of the long message. The receiver, in turn, selectively turns-on during the time slots referenced in the initial pointer packet sequentially reading each portion of the long message. After the entire message, the receiver reverts back into the previous polling mode to consume battery power.

Another embodiment of the invention defines a fast periodic data acquisition protocol in an initial fast cycle rate packet. The receiver upon reading a cycle rate value from the initial fast cycle rate packet, begins reading data packets from subsequent time slots in the data frame at the cycle rate value. The data acquisition rate defined by the fast cycle rate value is faster than the polling rate. Thus, a long message is read in significantly less time than would be the case if the receiver were reading the message at the slower polling rate. The fast cycle rate packet defines a data acquisition rate and the number of data packets in the message. The receiver again starts reading data at the polling rate after reading each portion of the message.

In still another embodiment of the invention, a data format packet defines an output rate in which data is output by the receiver. The receiver is then turned on continuously reading each packet from the frame in an asynchronous manner and outputting data at the rate defined by the data format packet. The receiver remains active until another format packet changes the output rate to zero. The receiver then goes back into a polling mode.

A majority of the receiver battery power is consumed while polling for messages. Thus, increasing the receiver "on time" only briefly while receiving a long message, maintains long battery operating life. Since the data acquisition rate of the receiver is higher than the polling rate, the receiver has the capacity to quickly receive and output long messages.

The various data acquisition protocols described above allow data to be transmitted and received in a time and energy efficient manner independently of the polling rate. The data acquisition protocols described above also allow redundant transmission of long messages thereby ensuring reliable data communication. Further, the data acquisition protocol also allows short messages or priority messages to be sent quickly over a single selected slot.

The foregoing and other objects, features and advantages of the invention will become more readily apparent from the following detailed description of a preferred embodiment of the invention which proceeds with reference to the accompanying drawings.

DETAILED DESCRIPTION

Figure 1:
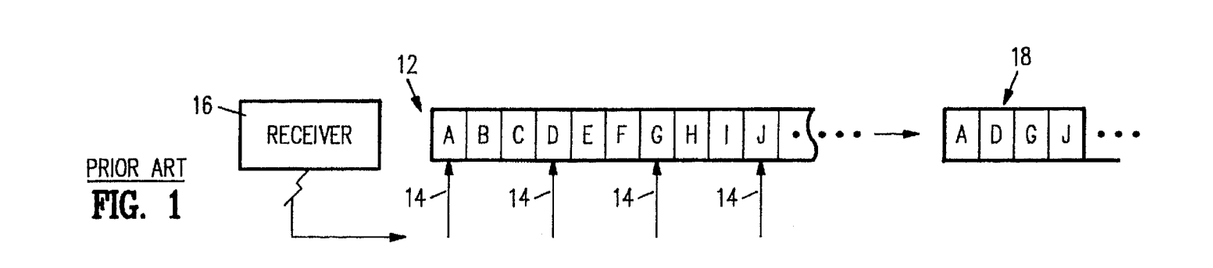
FIG. 1 shows a prior art method for polling a data stream at a periodic rate.
Figure 2:
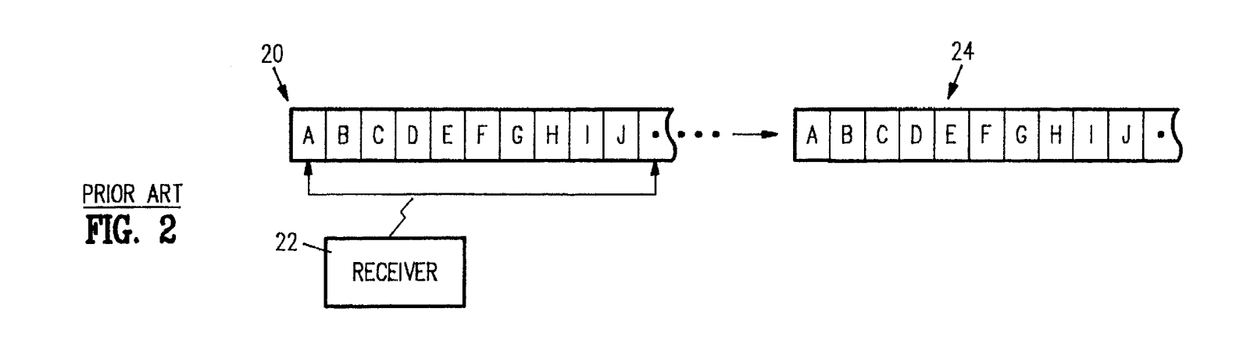
FIG. 2 shows a prior art method for asynchronously receiving data.

FIGS. 1 and 2 show prior art communication protocols for transmitting and receiving data. Letters "A" through "J" each represent a time slot containing data packets queued in a sequential order forming a TDM data stream 12. Polling data in a wireless one-way communication system and the data formats and protocols used in transmitting and receiving data is described in detail in U.S. Pat. No. 4,713,808 to Gaskill et al. which is herein incorporated by reference.

Arrows 14 identify discrete units of time when the data stream is polled by a receiver 16. Arrows 14 indicates that receiver 16 is turned on during time slots "A", "D", "G" and "J". While receiver 16 is on, the information in each of these time slots is processed. For example, an address contained in time slot "A" matches the address assigned to receiver 16, a data packet transmitted during time slot "A" is targeted for receiver 16. Receiver 16 then reads the data packet in time slot "A" and outputs the associated message. For example, in a paging system, the message contained in time slot "A" is displayed on a pager receiver in the form of a phone number, slot message, etc.

Because the batteries used to power receiver 16 have a limited operating life, data stream 12 is polled for only short bursts of time as indicated by arrows 14. If each time slot "A", "D", "G" and "J" contain a message addressed to receiver 16, the data packets in each time slot are output from receiver 16 as shown in output message 18. In standard paging systems only a limited number of characters (e.g., 10) can be transmitted in any one data packet. Thus, the communication protocol shown in FIG. 1 is not effective for transmitting long messages containing dozens of characters.

FIG. 2 shows a data stream 20 processed asynchronously by a receiver 22. Receiver 22 is continuously reading data packets from each time slot in data stream 20. If each data packet "A"–"J" contains information addressed to receiver 22, the receiver outputs a message 24. The communication protocol shown in FIG. 2 is effective in transmitting long messages. However, the receiver 22 remains on continuously. Thus, protocol in FIG. 2 impractical is in portable one-way receivers where receiver power consumption must be rationed to extend battery life.

Figure 3:
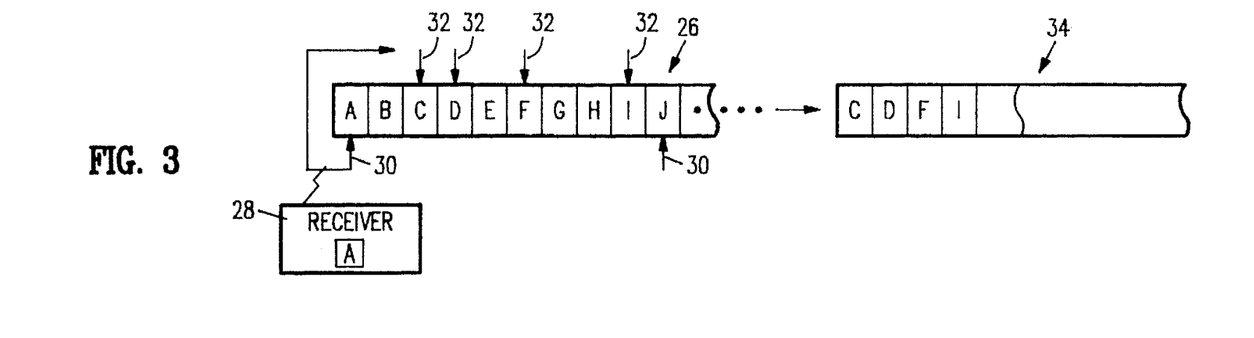
FIG. 3 is a TDM data stream containing a long message that is processed by using both a first periodic polling rate in combination with pointers from a pointer packet according to one embodiment of the invention.

FIG. 3 shows a one-way wireless communication protocol that incorporates a first data polling scheme in conjunction with a second data acquisition scheme for communicating long messages while at the same time maintaining extended receiver battery life. A data stream 26 contains time slots "A"–"J". Time slot "A" contains an initial pointer packet and time slots "B"–"J" contain data packets. A sample format of the pointer packet and data packets are shown in further detail in FIG. 6.

A receiver 28 initially polls data stream 26 at a predetermined periodic rate as indicated by arrows 30 in a manner similar to receiver 16 shown in FIG. 1. Receiver 28 is assigned an associated address and is configured to activate in a synchronized manner with a corresponding time slot in data stream 26 (i.e., time slots "A" and "J"). Thus, receiver 28 is turned on for a sufficient amount of time to read the information in time slot "A". An address contained within time slot "A" is compared with the address assigned to receiver 28. If the two addresses are the same, receiver 28 then reads the pointer packet located in time slot "A" that defines or determines the data acquisition protocol for reading the subsequent message. The pointer packet conveys to the receiver 28 that the data packet in time slot "A" containing relative slot addresses that point to additional time slots in data stream 26. Each relative slot location contains a portion of a single long message targeted for receiver 28.

Upon processing the pointer packet, receiver 28 changes into a second data acquisition mode. In this data acquisition mode, receiver 28 turns on during each subsequent time slot addressed in the pointer packet in time slot "A". Arrows 32 indicate each time slot identified in the pointer packet. Thus, receiver 28 turns on during time slots "C", "D", "F" and "I". The data packets in these time slots, are combined to form a long message 34. After all the data packets referenced in the pointer packet in time slot "A" are output, receiver 28 reverts back into the regular polling mode as indicated by arrow 30 directed to time slot "J".

Thus, receiver 28 receives long messages significantly faster than the polling scheme shown in FIG. 1. Since, only a small percentage of the operating time of receiver 28 is actually used in acquiring data, the additional "on-time" during the data acquisition period does not significantly effect receiver battery life. Since receiver 28 reverts back into a polling mode after the message 34 is output, power continues to be rationed for a majority of the operating time of receiver 28.

Figure 4:
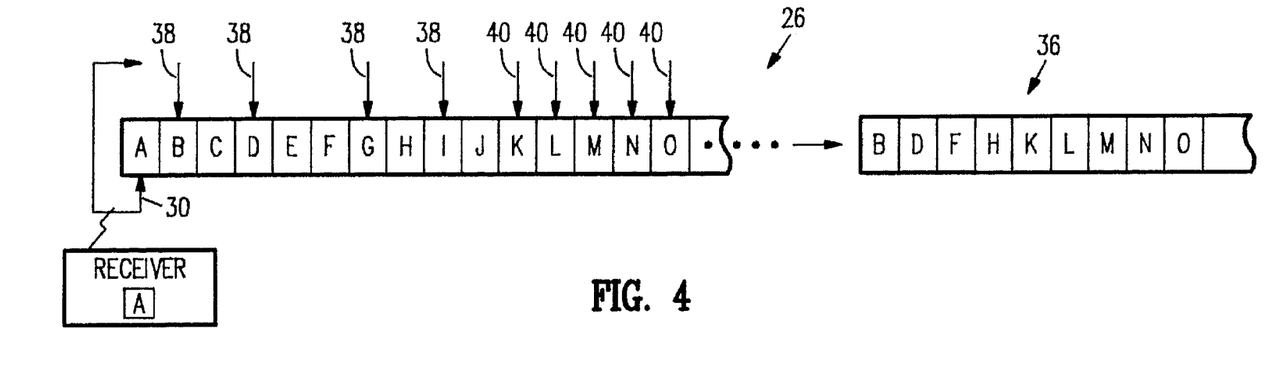
FIG. 4 is a TDM data stream containing a long message processed by using both a first periodic polling rate in combination with a second periodic data acquisition rate according to another embodiment of the invention.

FIG. 4 describes another data communication protocol for receiving long messages where the receiver 28 turns on at two different periodic data rates. Data stream 26 is substantially the same as data stream 26 shown in FIG. 3. However, the format packet in time slot "A" indicates that a periodic data acquisition protocol should be used to read a long message as opposed to the previously described aperiodic pointer scheme shown in FIG. 3.

Receiver 28 initially polls data stream 26 at the time slots indicated by arrows 30 in the same manner as previously described in FIG. 3. If the address in time slot "A" is the same as the address assigned to receiver 28, the format packet in time slot "A" is read. A fast cycle format packet in time slot "A" directs receiver 28 to begin turning on at a periodic data acquisition rate that is faster than the polling rate.

Arrows 38 represent each time slot that receiver 28 is turned on during the data acquisition period. Receiver 28 is directed by the fast-cycle packet to turn-on for a specific number of time slots and at a particular data acquisition rate. During the data acquisition period, the address in time slot "B" is first read to determine if the associated data packet is directed to receiver 28.

If the address in time slot "B" matches that of receiver 28, the data packet in time slot "B" is processed and output as part of message 36. If time slots "D", "F" and "H" also include the same address as receiver 26, each time slot is output in message 36.

After the selected number of time slots have been read, receiver 28 reverts back into the polling condition as shown by arrow 30 at time slot "J". If the address in time slot "J" again matches the receiver address and a second fast cycle format packet is transmitted, receiver 28 is turned on at the data acquisition rate indicated in the new format packet. For example, if time slot "J" contains another fast cycle packet, receiver 28 begins reading data packets at the new data acquisition rate as indicated by arrows 40.

Again, the receiver only operates at the data acquisition rate when the transmitter (not shown) notifies the receiver that a long message is about to be transmitted. Thus, receiver 28 is activated at the faster acquisition rate for only the brief time period when the message is being transmitted. Thus, for a majority of the time receiver 28 operates at the slower polling rate, in turn, conserving battery life.

Figure 5:
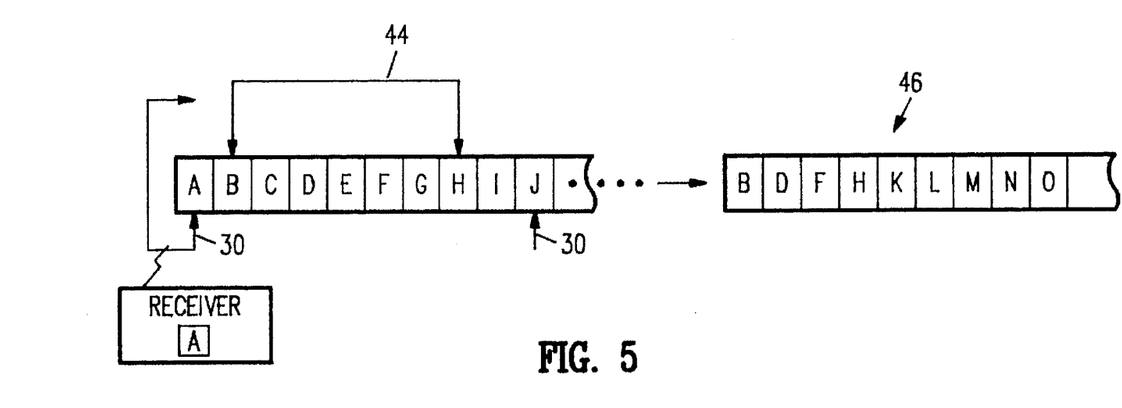
FIG. 5 shows a communication protocol for outputting asynchronously from a data stream at a selectable fixed rate according to another embodiment of the invention.

FIG. 5 illustrates a third data acquisition scheme where the receiver 28 is turned on continuously while outputting data at a selectable fixed output data rate. Data stream 26 is similar to the data stream shown in FIGS. 3 and 4. If the address in time slot "A" matches the address of receiver 28, format data in time slot "A" directs receiver 28 to turn on continuously as indicated by arrows 44. Receiver 28, in turn, will monitor each subsequent time slot for a matching address and corresponding data packets. Data packets with matching addresses are output as message 46.

The control data in time slot "A" directs receiver 28 to output data at a fixed output rate independent of the data transmission rate. If the data packets addressed to receiver 28 are not transmitted at the output rate defined in the format packet in time slot "A", receiver 28 fills in empty time slots with bogus data (e.g., questions marks) in message 46. To change receiver 28 back to the polling mode, the format packet from one of the time slots subsequent to time slot "A" changes the output data rate back to zero. The receiver 28, in turn, reverts back into a polling mode as indicated by arrow 30 at time slot "J".

The data acquisition scheme shown in FIG. 5 provides highly reliable data communication. For example, by keeping receiver 28 continuously turned on, and by specifying a given data rate lower than the transmission rate of data stream 26, duplicate messages can be quickly transmitted and error correction protocols employed to ensure reliable error free message transmission. Thus, the asynchronous communication protocol described in FIG. 5 incorporates a second fixed output rate that is independent from both the polling rate and the data transmission rate.

Figure 6:
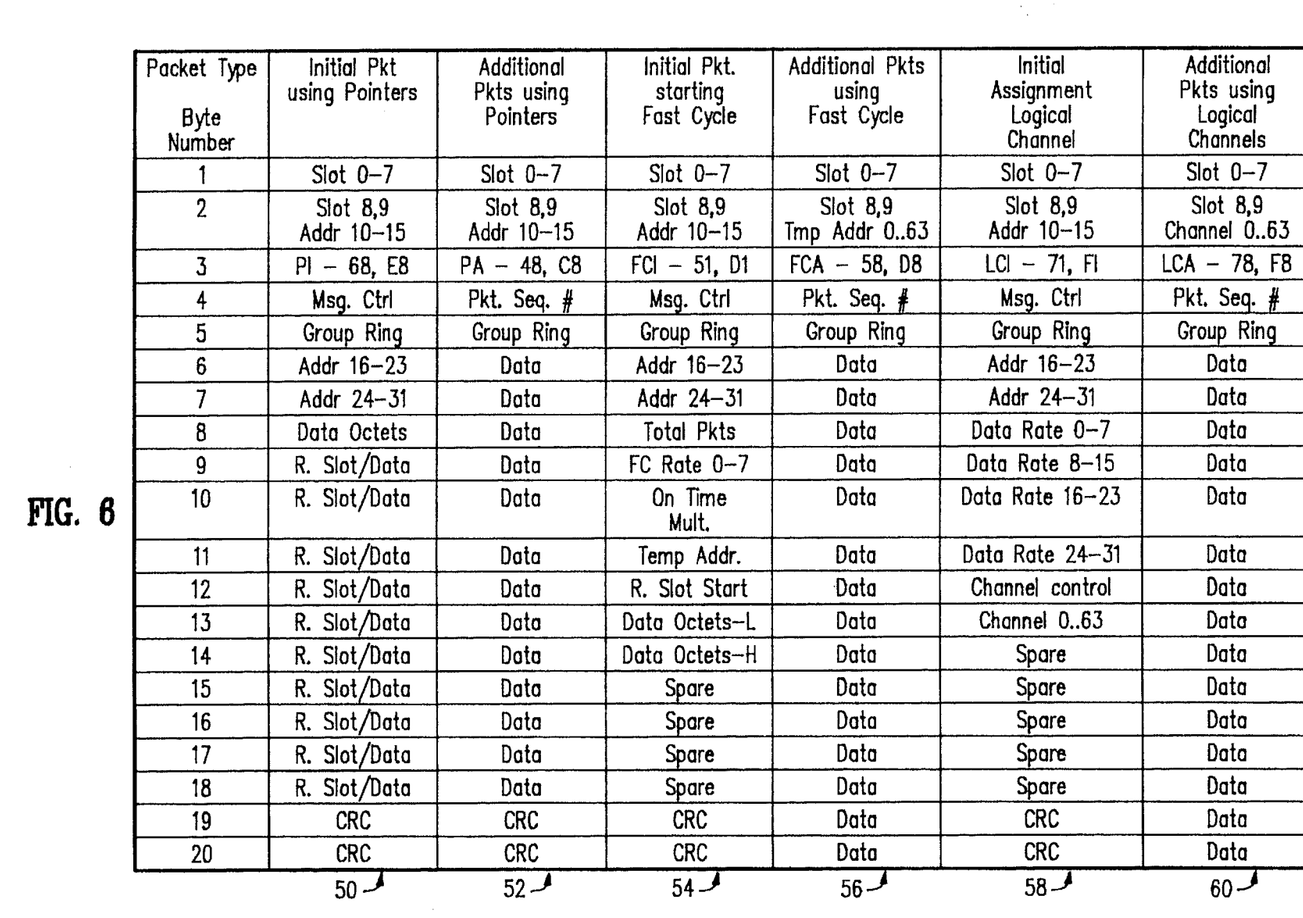
FIG. 6 is a table of packet formats for implementing the data acquisition protocols shown in FIGS. 3, 4, and 5.

FIG. 6 is a table showing the format packets transmitted by a transmitter for performing the long message communication protocols described in FIGS. 3, 4 and 5. While the table in FIG. 6 describes specific formats for performing wireless one-way long message communication, it is understood that alternative data formats can be used to implement the techniques previously described in FIGS. 3–5.

Each vertical column 50–60 in FIG. 6 represents a packet of information that is queued and transmitted in a specific time slot in data stream 26 (FIG. 3). There are 20 bytes in each packet each associated with a specific command or data information directed to receive 26. Typically, each packet and the associated time slot are combined with additional time slots forming a subframe. Multiple subframes (64) are, in turn, combined together forming a frame.

The transmitter (not shown) continuously sends out frames of data. Each frame lasts for approximately 15 minutes and contains TDM messages for many different receivers. The receiver 28 (FIG. 3) in one embodiment, polls each frame approximately eight times or about once every other subframe.

The packets 50 and 52 contain pointer packet formats for performing the data acquisition scheme described in FIG. 3. Packet 50 is referred to as a format packet and is the initial packet read by receiver 28 before entering into the pointer operation for reading a long message. Bytes 1–8 identify the time slot number, receiver address and indicate that a long message is being transmitted in the pointer format.

Bytes 9–18 contain relative slot addresses that identify where portions of the long message reside in the sub-frame or frame. Each relative slot address (i.e., pointer) in bytes 9–18 represents a relative temporal distance between adjacent portions of the long messages. For example, if the pointer value in byte 9 is 5, the first time slot containing a portion of the message is 5 time slots from the initial time slot containing format packet 50. If the address in byte 10 is 3, the next format data packet containing a second portion of the long message is 3 time slots from the time slot identified in byte 9. By using relative addressing, fewer bits are necessary to identify the different locations where the message is positioned in the frame.

Data packet 52 contains a portion of the long message. Bytes 1–5 specify the slot number, format and sequence of the data packet. Data sequencing is explained in more detail below in FIG. 8. Bytes 6–18 contain a portion of the long message. In the format shown in packets 50 and 52, 10 pointers are contained in each format packet 50 and 13 data bytes are contained in each data packet 52. Thus, up to 130 characters can be transmitted in a long message.

Packets 54 and 56 represent the data format for the periodic fast cycle data acquisition protocol previously described in FIG. 4. Bytes 1–7 in format packet 54 again identify the slot number, intended receiver address for the long message, and the periodic rate that the receiver will turn on while receiving the long message.

Byte 8 in packet 54 indicates the total number of data packets that will be read during the data acquisition period and byte 9 indicates the rate that data packets will be read. For example, a value of 100 in byte 8 directs the receiver to read 100 data packets. A value of 5 in byte 10 directs the receiver to read every fifth time slot.

Byte 10 is an on time multiplier that directs the receiver to repeat the data acquisition sequence a given number of times to ensure receiving a complete long message. For example, other receivers may be turned on during the same time slots. Thus the time slot may not be available to receiver 28. The on time multiplier in byte 10 directs receiver 28 to repeat in the data acquisition process a given number of times to increase the possibility of receiving the entire long message. Thus, a value of two for the on time multiplier will direct the receiver to read every fifth time slot for two hundred time slots.

A temporary address is contained in byte 11 and is used to identify the receiver associated with the data packet. Byte 12 identifies the beginning relative time slot for the periodic data acquisition process. Bytes 13 and 14 identify the number of data octets that are transmitted. If the last data packet is not full, bytes 13 and 14 direct the receiver to stop reading data after the last byte in the long message. Once all control information has been identified in the fast cycle packet 54, multiple data packets similar to packet 56 contain different portions of the long message.

Packets 58 and 60 contain the packet format used for the asynchronous selectable fixed rate data output protocol previously described in FIG. 5. Bytes 1–7 again identify the time slots, receiver address and the asynchronous and the data acquisition protocol that will be used to read the long message. Bytes 8–11 in format packet 58 identify the rate that data is output by receiver 28. Data packet 60 contains a portion of the long message directed to receiver 28.

Figure 7:
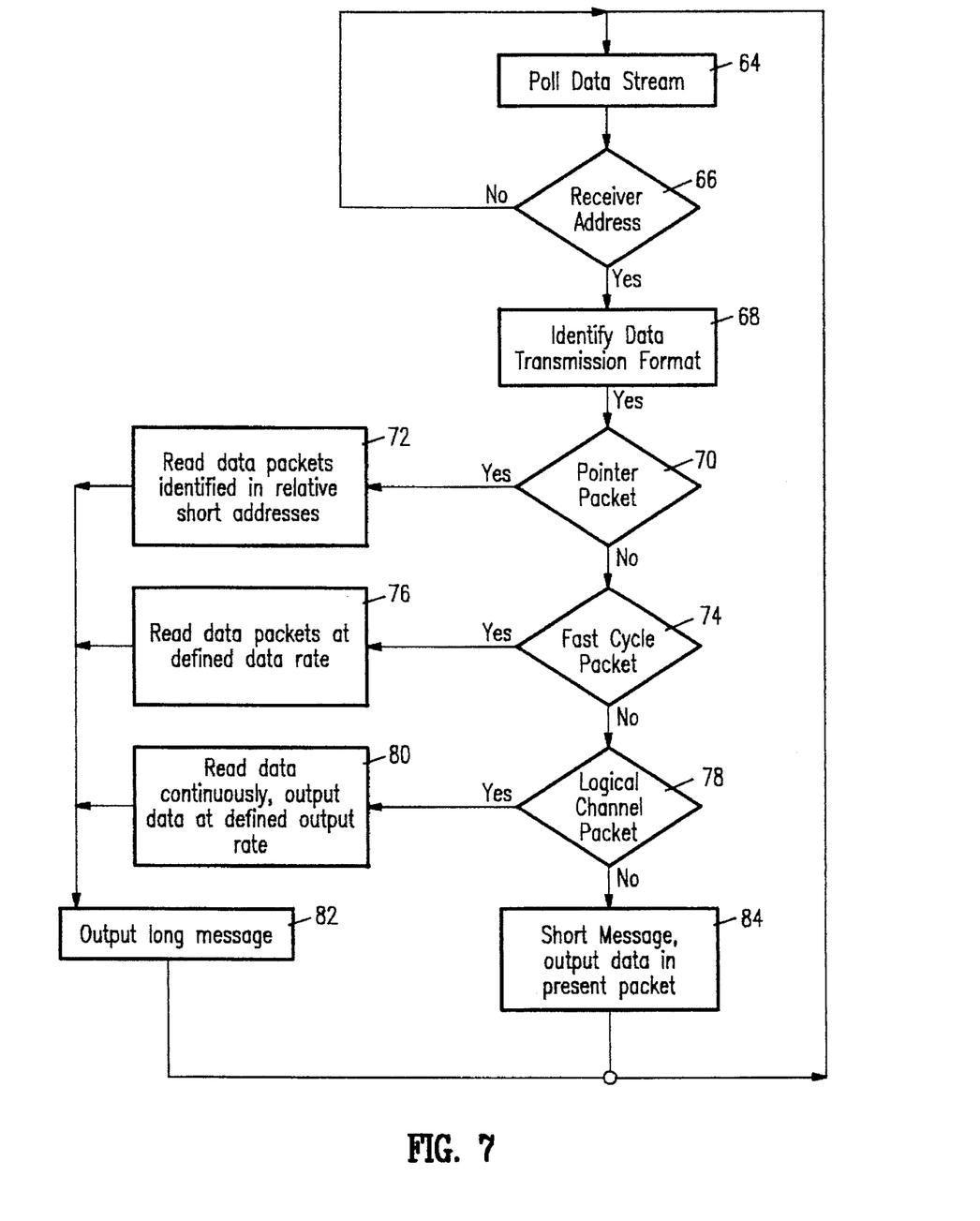
FIG. 7 is a flow diagram for initiating the different data acquisition protocols described in FIGS. 3, 4 and 5.

FIG. 7 is a flow diagram outlining the data communication protocols described above. While the specific types and sequence of protocols used for data communication may vary, FIG. 7 identifies 4 typical communication protocols that can be separately enabled in a common receiver.

Block 64 initiates the standard polling scheme used by the receiver to identify a transmitted message. Decision block 66 checks the address in the format packet. If the address in the format packet does not match the assigned address of the receiver, the receiver continues the polling operation in block 64. If the address in the format packet matches the assigned address for the receiver, block 68 determining the format of the transmitted message.

If a pointer format is indicated, decision block 70 jumps to block 72 where the receiver is directed to read only the data packets in the relative time slots indicated in the initial pointer packet. If a fast cycle packet protocol is identified in decision block 74, block 76 directs the receiver to read subsequent data packets at a periodic data acquisition rate.

When decision block 78 identifies a fixed rate output packet, block 80 changes the receiver into a continuous reception mode as opposed to the burst reception modes used in blocks 72 and 76. Block 80 also directs the receiver to output data at the specified output rate contained in the format packet.

The data received when using the data acquisition protocols in blocks 72, 76, and 80 is then output as a long message in block 82. If a long message protocol is not identified, a standard short message protocol is indicated. Block 84 will then direct the receiver to output the message in the data packet contained in the format packet. After the long message or short message is output, block 64 changes the receiver back into the polling mode in anticipation of the next message.

Figure 8:
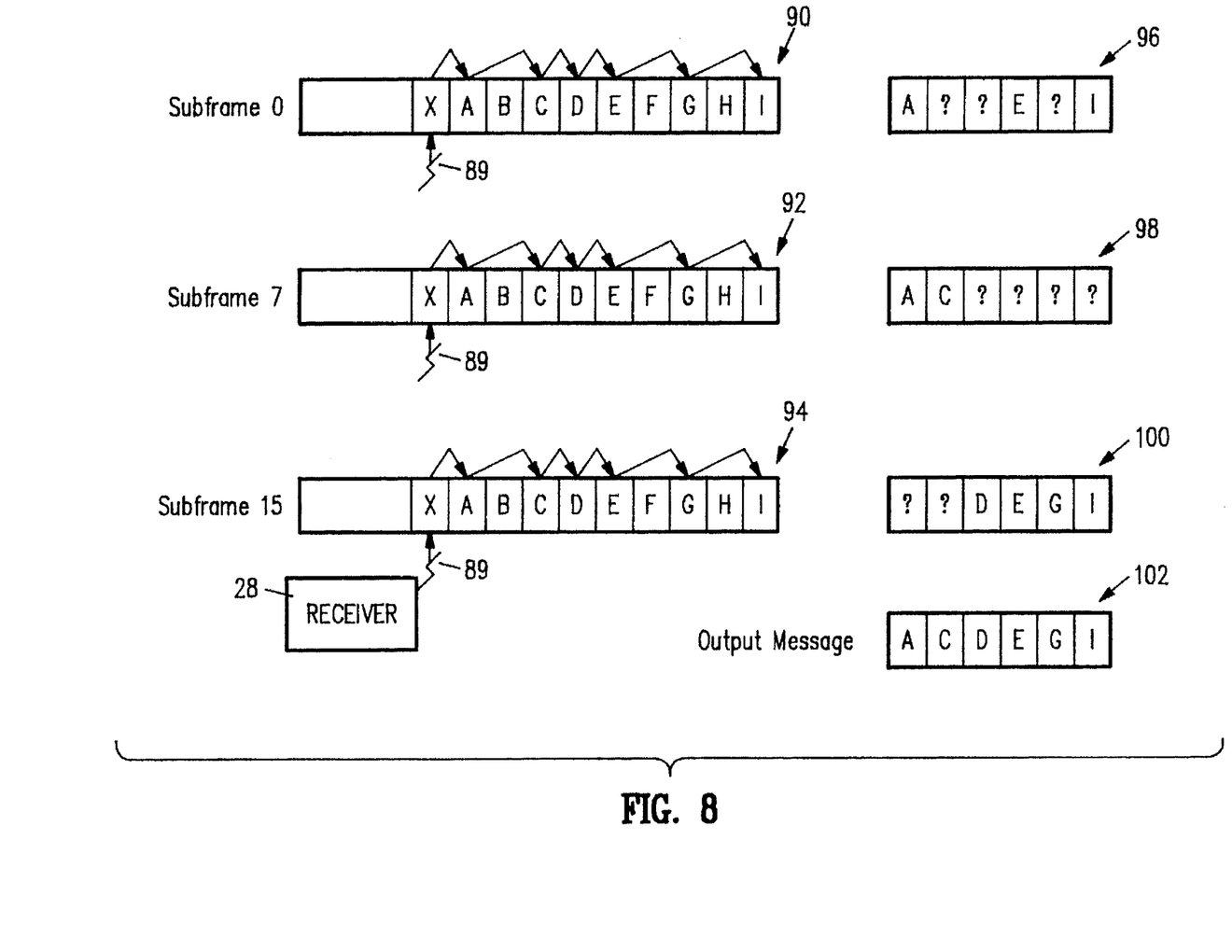
FIG. 8 shows multiple subframes from a single frame containing redundant long messages.

FIG. 8 shows subframes 90, 92, and 94 each representing portions of a frame. Each subframe contains the same long message directed to receiver 28. Because the receiver 28 is mobile and only receives messages, an entire message or a portion of a message may not be successfully transmitted. For example, car ignition noise and broadcast noise can disrupt the transmitted message. Alternatively, nulls in the data transmission can occur, for example, when the receiver is passing though a tunnel. Thus, the same message is transmitted several times to increase the probability of successful transmission.

The packet sequencing number identified in byte 4 of packets 52, 56, and 60 in FIG. 6, is used as a flag to indicate which portion of a long message is presently being transmitted. For example, a sequence number of zero indicates the first block in a message, and sequence number one indicates the second block in the long message. Thus, the receiver can reconstruct an entire message from different portions of multiple messages.

For example, FIG. 8 shows the same identical message transmitted in three different subframes. The first iteration of the message is transmitted in subframe 0, the second iteration is transmitted two minutes later in subframe 7 and the third iteration is transmitted two minutes later in subframe 15. The receiver 28 polls subframe zero at time slot "X" as indicated by arrow 89. The format packet in time slot "X" indicates that a long message will be transmitted using a pointer packet protocol. Thus, pointers in the format packet in time slot "X" indicate that the long message is contained in time slots "A", "C", "D", "E", "G" and "I".

Due to interference, receiver 28 may only successfully receive portions of the long message contained in time slots "A", "E" and "I" as indicated in output 96. A "?" in a time slot indicates that the data packet in the associated time slot was not successfully read by the receiver. The packet sequence number allows the receiver to determine which portions of the message are missing. Thus, the receiver can incorporate missing portions of the message from a subsequent transmission of the long message.

For example, the long message is again transmitted to receiver 28 in subframe 7. The receiver combines portions of the long message not received in subframe 0 with data packets successfully received in subframe 7. Output 98 indicates that only the portions of the message in time slots "A" and "C" were successfully received in the second transmission in subframe 7. Thus, the portion of the message contained in time slot "C" is combined with the message initially received in subframe 0.

Subsequent portions of the message unsuccessfully received in subframes 0 or 7 are combined with successfully received portions of the message received in subframe 15. The portion of the message located in time slot "G" as indicated by output 100 was successfully read by the receiver in subframe 15. Thus, the portion of the message in time slot "G" is combined with the rest of the message read in subframes 0 and 7.

The final output 102 contains portions of data packets from subframes 0, 7, and 15. Because the message has more than one chance to be successfully transmitted to the receiver, reliability of the long message transmission is incurred. The message interleaving process shown in FIG. 8 can be used in conjunction with any of data acquisition protocols shown in FIGS. 3, 4 and 5.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A method for communicating long messages in a wireless one-way communication system, comprising:

transmitting a time division multiplexed data frame which includes both format packets and data packets positioned in specific temporal locations in said data frame, each format packet containing both an address corresponding to an associated receiver and containing pointers to a plurality of data packets each containing a portion of a given long message targeted for transmission to a given receiver;

polling the data frame with said given receiver at a first data rate for receiving an initial format packet addressed to said given receiver; and reading said plurality of data packets containing the long message at a second data acquisition rate defined by the initial format packet, the data acquisition rate defined according to temporal locations in the data frame of data packets containing portions of said long message.

2. A method for directing long messages in a wireless one-way communication system, comprising:

transmitting a time division multiplexed data stream including both pointer packets and data packets, each pointer packet containing an address corresponding to an associated receiver and containing pointers to a plurality of data packets each containing a portion of a long message targeted for transmission to said associated receiver;

turning on said associated receiver at predetermined times and at a first predetermined rate thereby polling said data stream at discrete instances of time for identifying an initial pointer packet directed to said associated receiver; and turning on said associated receiver at a second rate according to the temporal locations associated with the pointer values contained in the initial pointer packet thereby reading each said portion of said long message contained within said plurality of data packets directed to said receiver at said second rate.

* * * * *